(12) United States Patent
Swanson et al.

(10) Patent No.: US 7,874,160 B2
(45) Date of Patent: Jan. 25, 2011

(54) NOZZLE-AREA RATIO FLOAT BIAS

(75) Inventors: Timothy A. Swanson, Coventry, CT (US); Sean P. Zamora, Coventry, CT (US); Robert H. Bush, Glastonbury, CT (US); Alex J. Simpson, Mansfield, CT (US)

(73) Assignee: United Technologies Corporation, Hartford, CT (US)

( * ) Notice: Subject to any disclaimer, the term of this patent is extended or adjusted under 35 U.S.C. 154(b) by 739 days.

(21) Appl. No.: 11/894,313

(22) Filed: Aug. 21, 2007

(65) Prior Publication Data

US 2009/0072049 A1    Mar. 19, 2009

(51) Int. Cl.
*F02K 1/00* (2006.01)
(52) U.S. Cl. .................................... 60/771; 239/265.19
(58) Field of Classification Search .................. 60/770, 60/771; 239/265.19, 265.11, 265.39
See application file for complete search history.

(56) References Cited

U.S. PATENT DOCUMENTS

| | | | |
|---|---|---|---|
| 3,214,904 A * | 11/1965 | Bailey et al. ........... | 239/265.17 |
| 3,807,637 A | 4/1974 | Camboulives et al. | |
| 3,814,325 A | 6/1974 | McCardle, Jr. et al. | |
| 4,043,509 A | 8/1977 | McHugh et al. | |
| 4,245,787 A | 1/1981 | Freid | |
| 4,310,121 A | 1/1982 | Basinski, Jr. | |
| 4,456,178 A | 6/1984 | Jones et al. | |
| 4,799,623 A | 1/1989 | Bruchez, Jr. et al. | |
| 4,819,876 A | 4/1989 | Thayer | |
| 4,993,641 A | 2/1991 | Kehret et al. | |
| 5,150,839 A | 9/1992 | Reedy | |
| 5,364,029 A | 11/1994 | Barcza | |
| 5,398,499 A | 3/1995 | Urruela | |
| 5,566,884 A * | 10/1996 | Hardy et al. ........... | 239/265.41 |
| 5,797,544 A | 8/1998 | Ward | |
| 5,813,611 A | 9/1998 | Cires et al. | |
| 6,398,129 B1 | 6/2002 | Johnson | |
| 6,779,336 B2 | 8/2004 | Allore et al. | |
| 7,032,835 B2 | 4/2006 | Murphy et al. | |
| 7,096,661 B2 | 8/2006 | Bush et al. | |
| 7,174,704 B2 | 2/2007 | Renggli | |
| 2007/0039328 A1 * | 2/2007 | Petty et al. ................. | 60/771 |

\* cited by examiner

*Primary Examiner*—Michael Cuff
*Assistant Examiner*—Phutthiwat Wongwian
(74) *Attorney, Agent, or Firm*—Kinney & Lange, P.A.

(57) ABSTRACT

A mechanism included in a convergent-divergent nozzle connected to an aft portion of a gas turbine engine, which mechanism includes a convergent flap configured to be kinematically connected to the aft portion of the gas turbine engine, a divergent flap pivotally connected to the convergent flap and configured to be kinematically connected to the aft portion of the gas turbine engine, at least one actuator configured to be connected to the aft portion of the gas turbine engine and to mechanically prescribe the position of the convergent flap and the divergent flap by moving through one or more positions, and at least one biasing apparatus. The biasing apparatus is configured to position at least one of the convergent flap and the divergent flap independent of the positions of the actuator by substantially balancing a force on the at least one of the convergent flap and the divergent flap produced by a gas pressure on the nozzle.

16 Claims, 6 Drawing Sheets

NOZZLE-AREA RATIO FLOAT BIAS

STATEMENT OF GOVERNMENT INTEREST

This invention was made with Government support under N00019-02-C-3003 awarded by Department of the Navy. The Federal Government has certain rights in this invention.

BACKGROUND

The present invention relates to convergent-divergent nozzles used in gas turbine engines. In particular, the present invention relates to convergent-divergent nozzles with a floating area ratio.

Prior gas turbine engines have, in some configurations, included exit nozzles attached to the aft end of the engine. Exit nozzles are commonly employed to produce additional thrust for the engine by accelerating the working medium gas, for example air, leaving the aft end of the main engine, for example via the low pressure turbine, through the nozzle. Exit nozzles accelerate the air leaving the engine, and therefore produce useful thrust, by prescribing the nozzle area for particular exit pressures inside the nozzle. One such exit nozzle is the variable convergent-divergent nozzle. Prior variable convergent-divergent nozzles commonly include convergent-divergent flap sets arranged circumferentially about the main axis of the engine to form a substantially circular annular nozzle extending aft of, for example, the low pressure turbine. The convergent-divergent flap sets are commonly connected to an annular ring, sometimes referred to as a sync ring, which is in turn connected to an engine casing. The convergent flap in each of the convergent-divergent flap sets declines generally toward the main axis of the engine as the flap extends aftwardly. The divergent flap in each of the convergent-divergent flap sets may be pivotally connected to the convergent flap and inclines generally away from the main axis of the engine as the flap extends aftwardly. The circumferentially arranged convergent-divergent flap sets therefore form an annular nozzle whose cross-sectional area decreases from the forward end of the nozzle to a throat generally defined by the pivotal connection between the convergent and divergent flaps and then increases from the throat to the nozzle exit.

In order to operate efficiently, variable convergent-divergent nozzles are configured to position the convergent and divergent flaps, and thereby the annular shape of the entire nozzle, to optimize engine performance. The position of the convergent and divergent flaps, and thereby the annular shape of the nozzle is commonly represented by the ratio of the cross-sectional area of the nozzle at the exit ($A_E$) divided by the cross-sectional area of the nozzle at the throat ($A_T$), or $A_E/A_T$. The nozzle pressure ratio (NPR) is equal to the total pressure at the nozzle throat ($P_T$) divided by the ambient pressure ($P_{Amb}$), or NPR=$P_T/P_{Amb}$. Convergent-divergent nozzles function generally by designing $A_E/A_T$ for critical flight conditions (NPR) in order to produce useful thrust by extracting as much energy as is practicable from the working medium gas flowing through the nozzle.

Prior variable convergent-divergent nozzles have used various means to vary the position of the convergent and divergent flaps for different engine conditions. For example, some prior convergent-divergent nozzles have mechanically prescribed the position of the convergent and divergent flaps through a kinematic mechanism driven by one or more actuators to tune $A_E/A_T$ for specific engine conditions. Prior convergent-divergent nozzles have also employed kinematics that vary $A_E/A_T$ with respect to $A_T$ to achieve improved performance at multiple engine operating conditions. This arrangement allows for a single valued $A_E/A_T$ for all $A_T$ without the weight and complexity of independently controlling $A_E/A_T$. Other prior convergent-divergent nozzles have employed a toggling configuration triggered by the pressure inside the nozzle, which acts to position the divergent flaps for low and high $A_E$ respectively (low and high mode). Nozzles employing such a toggling configuration are considered to have two available values of $A_E$ for each $A_T$. At low $A_T$, which is typical of aircraft cruise and low values of NPR, a low value of $A_E/A_T$ is desirable. At relatively high values of $A_T$ a higher value of $A_E/A_T$ is desirable, which corresponds to conditions associated with aircraft acceleration. Thus the low mode (low $A_E/A_T$) condition corresponds to relatively low values of NPR and high mode (higher $A_E/A_T$) corresponds to relatively high values of NPR.

Prior variable convergent-divergent nozzles have several disadvantages with respect to $A_E/A_T$. In prior nozzles independently controlling $A_T$ and $A_E$, one disadvantage is weight and complexity (design and control). For scheduled (single valued) $A_E/A_T$ nozzles, one disadvantage is an inability to run optimally at low and high NPR (cruise and acceleration). More generally, prior nozzle designs have varied the nozzle geometry to optimally position the convergent and divergent flaps at low mode and high mode, but have failed to vary the convergent and divergent flaps position through an intermediate mode of engine operation between low and high modes. Therefore, prior nozzle configurations have failed to advantageously position the convergent and divergent flaps for a substantial number of NPR values encountered during engine operation, thereby causing sub-optimal engine performance at many of the NPR values encountered.

SUMMARY

Embodiments of the present invention include a mechanism included in a convergent-divergent nozzle connected to an aft portion of a gas turbine engine, which mechanism includes a convergent flap configured to be kinematically connected to the aft portion of the gas turbine engine, a divergent flap pivotally connected to the convergent flap and configured to be kinematically connected to the aft portion of the gas turbine engine, at least one actuator configured to be connected to the aft portion of the gas turbine engine and to mechanically prescribe the position of the convergent flap and the divergent flap by moving through one or more positions, and at least one biasing apparatus. The biasing apparatus is configured to position at least one of the convergent flap and the divergent flap independent of the positions of the actuator by substantially balancing a force on the at least one of the convergent flap and the divergent flap produced by a gas pressure on the nozzle.

DETAILED DESCRIPTION

Figure 1:
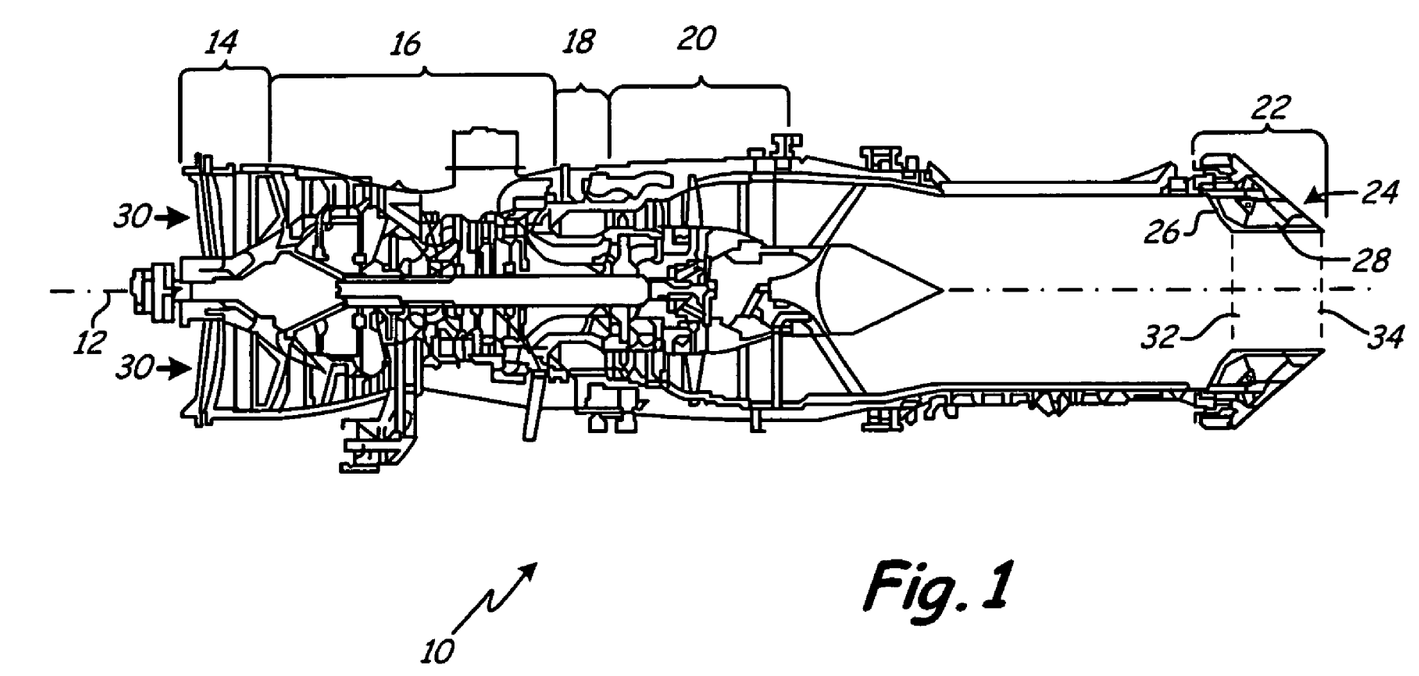
FIG. 1 is an axial section view of a gas turbine engine including a variable convergent-divergent nozzle according to the present invention.

FIG. 1 is an axial section view of gas turbine engine 10 including engine axis 12, fan 14, compressor 16, combustion section 18, turbine 20, and variable convergent-divergent nozzle 22. Nozzle 22 includes a plurality of mechanisms 24, which mechanisms 24 include a plurality of convergent flaps 26 and divergent flaps 28 circumferentially arranged around engine axis 12. During operation of engine 10, working medium gas stream 30, for example a stream of air, is pulled into the front of engine 10 by fan 14, by the rotation of fan blades about axis 12. Fan 12 directs a portion of gas stream 30 into compressor 16. Working medium gas 30 is successively compressed through stages of compressor 16 and directed into combustor section 18. In combustor section 18, gas stream 30 is mixed with fuel and ignited. The gas and fuel mixture ignited in combustor section 18 is directed into turbine 20 in which the mixture is successively expanded. A portion of the energy of the gas and fuel mixture expanded through turbine 20 powers fan 14 and compressor 16 through co-joined shafting. The remaining portion of the energy of the gas and fuel mixture expanded through turbine 20 exits the back of engine 10 through nozzle 22 to produce useful thrust for engine 10.

Nozzle 22 augments the thrust produced by the gas and fuel mixture expanded through turbine 20 by accelerating the gas and fuel mixture through the exit of engine 10. Nozzle 22 accelerates the gas and fuel mixture leaving the engine, and thereby produces additional thrust, by prescribing the nozzle area for particular exit pressures inside the nozzle. Specifically, nozzle 22 in FIG. 1 includes convergent and divergent flaps 26, 28 circumferentially arranged to form a generally circular annular nozzle 22. The aft end of convergent flaps 26 are pivotally connected to the forward end of divergent flaps 28. The cross-sectional area of nozzle 22 decreases from the forward end of convergent flaps 26 to nozzle throat 32 defined by a plane perpendicular to engine axis 12 and passing through the pivotal connection between convergent and divergent flaps 26, 28. From nozzle throat 32, the cross-sectional area of nozzle 22 increases toward engine exit 34. Nozzle 22 accelerates the gas and fuel mixture leaving turbine 20 by prescribing the ratio of the area of nozzle 22 at engine exit 34 ($A_E$) divided by the area of nozzle 22 at nozzle throat 32 ($A_T$) for different pressures inside nozzle 22. As discussed above, nozzle pressures are generally represented by NPR, which, in FIG. 1, is equal to the pressure at nozzle throat 32 ($P_T$) divided by the ambient pressure ($P_{Amb}$), or NPR=$P_T/P_{Amb}$. Therefore, nozzle 22 prescribes $A_E/A_T$ by positioning convergent and divergent flaps 26, 28, as a function of varying values of NPR encountered during operation of engine 10.

Figure 2:
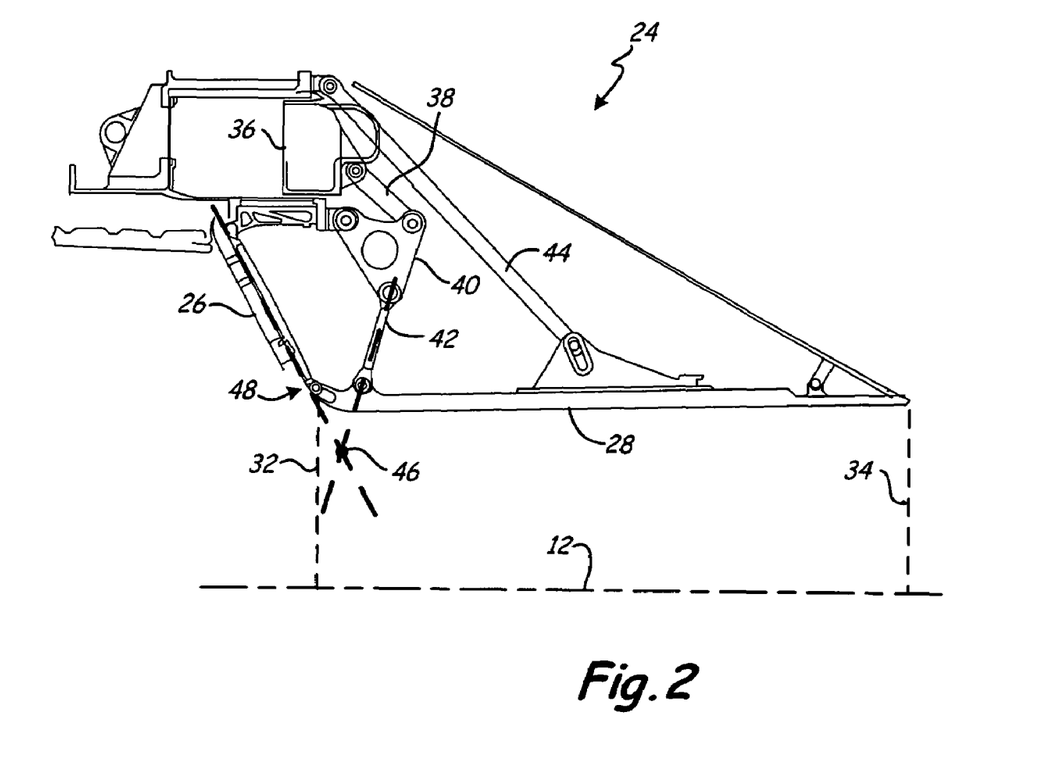
FIG. 2 is a side view of one mechanism included in the convergent-divergent nozzle of FIG. 1.

FIG. 2 is a side view of mechanism 24 included in nozzle 22 of FIG. 1. Mechanism 24 includes convergent flap 26, divergent flap 28, actuator 36, first link 38, second link 40, third link 42, fourth link 44, and divergent flap rotation center 46. In FIG. 2, the forward end of convergent flap 26 is pivotally connected to the aft end of engine 10 (shown in FIG. 1). In alternative embodiments of mechanism 24, the forward end of convergent flap 26 may be pivotally attached to an intermediate link attached to the aft end of engine 10, or convergent flap 26 may be pivotally attached to an actuator attached to the aft end of engine 10. The aft end of convergent flap 26 is pivotally connected to the forward end of divergent flap 28 at which connection generally defines nozzle throat 32. Actuator 36 is movably connected to the aft end of engine 10. First link 38 is pivotally connected between actuator 36 and second link 40. Second link 40 is pivotally connected between first link 38, the aft end of engine 10, and third link 42. Third link 42 is pivotally connected between second link 40 and divergent flap 28. Fourth link 44 is connected between the aft end of engine 10 and divergent flap 28 toward a middle portion of divergent flap 28. Fourth link 44 may be, as shown in FIG. 2, pivotally and slidably connected to divergent flap 28.

Mechanism 24 is configured to mechanically and aerodynamically prescribe the position of convergent and divergent flaps 26, 28 as a function of NPR. Specifically, mechanism 24 is a kinematic mechanism including the interconnection of convergent flap 26, divergent flap 28, and first, second, third, and fourth links 38-44 and mechanically driven by actuator 36. Actuator 36 is configured to move forward and aftward through one or more positions, which actuator 36 movement mechanically drives mechanism 24 and thereby positions convergent and divergent flaps 26, 28. The movement of actuator 36 may be controlled to position convergent and divergent flaps 26, 28 for varying values of NPR encountered during operation of engine 10.

Independent of the movement of actuator 36, mechanism 24 is configured to vary the position of convergent and divergent flaps 26, 28 as a function of the gas pressure acting on nozzle 22 during operation of engine 10. Although mechanism 24 is configured to aerodynamically vary convergent and divergent flaps 26, 28 as a function of NPR, embodiments of the present invention also include configurations capable of aerodynamically prescribing the position of the convergent flap 26 but not the divergent flap 28 and configurations capable of aerodynamically prescribing the position of the divergent flap 28 but not the convergent flap 26. In FIG. 2, fourth link 44 is pivotally and slidably connected to divergent flap 28. The sliding connection between fourth link 44 and divergent flap 28 is configured to impart a degree of freedom of movement to divergent flap 28 independent of the mechanical positioning of mechanism 24 by actuator 36. For example, in FIG. 2 the sliding connection between fourth link 44 and divergent flap 28 is at a radially outward limit. However, as the pressure acting on nozzle 22 changes, divergent flap 28 may react to a force created by the pressure acting on nozzle 22 by rotating counter-clockwise about divergent flap rotation center 46 and moving along the sliding connection with link 44. In this example, the movement of divergent flap 28 is configured with a mechanical limit prescribed by the radially inward limit of the sliding connection with link 44.

In order to prescribe one or more positions of convergent and divergent flaps 26, 28 as a function of NPR, as opposed to only imparting an additional degree of freedom of movement, mechanism 24 includes biasing apparatus 48 configured to substantially balance the pressure acting to rotate convergent and divergent flaps 26, 28. In the embodiment of FIG. 2, biasing apparatus 48 is an offset hinge created by offsetting divergent flap rotation center 46 from the pivotal connections between divergent flap 28 and convergent flap 26 and third link 42. Biasing apparatus 48 is configured to employ the pressure inside nozzle 22 acting on convergent flap 26 to counteract and substantially balance the pressure inside nozzle 22 acting on divergent flap 28.

In operation at a given NPR value, mechanism 24 may mechanically prescribe the position of convergent and divergent flaps 26, 28 by the movement of actuator 36 and the kinematic interconnections of convergent and divergent flaps 26, 28, and first, second, third, and fourth links 38-44. Once the position of convergent and divergent flaps 26, 28 is mechanically prescribed, convergent and divergent flaps 26, 28 may float through a range of positions based on changing NPR values as the pressure inside nozzle 22 changes and biasing apparatus 48 automatically adjusts to substantially balance the pressure at a new convergent and divergent flap 26, 28 position. Mechanism 24 is configured to mechanically limit the range of floating positions of convergent and divergent flap 26, 28 achieved by the interaction between the pressure inside nozzle 22 and the balancing action of biasing apparatus 48. During engine operation, for example, at and below an NPR low mode value, the position of convergent and divergent flaps 26, 28 is configured to remain substantially fixed and is mechanically prescribed by the position of actuator 36. Between the NPR low mode value and an NPR high mode value, convergent and divergent flaps 26, 28 are configured to float through a range of positions as the pressure inside nozzle 22 is substantially balanced by biasing apparatus 48. At and above the NPR high mode value, the position of convergent and divergent flaps 26, 28 is configured to remain substantially fixed and is mechanically prescribed by the position of actuator 36. In the embodiment of FIG. 2, the mechanical limit on the float range of convergent and divergent flaps 26, 28 is provided by fourth link 44 and the pivotal and sliding connection between fourth link 44 and divergent flap 28.

Therefore, in FIG. 2, mechanism 24 may be configured to mechanically proscribe the position of convergent flaps 26, 28 at and below NPR low mode and at and above NPR high mode. Link 44 may be adjusted for different operating conditions of engine 10 to provide a mechanical limit on the float range of convergent and divergent flaps 26, 28 and thereby mechanically prescribe a particular convergent and divergent flap 26, 28 position at particular NPR low and high mode values. Mechanism 24, independent of mechanically proscribing the position of convergent and divergent flaps 26, 28, also may be configured to float the position of convergent and divergent flaps 26, 28 through a range of positions as the pressure inside nozzle 22 at values of NPR between high and low modes is substantially balanced by biasing apparatus 48. The offset hinge comprising biasing apparatus 48 may be adjusted to adapt mechanism 24 to different operating conditions of engine 10, i.e. to substantially balance different pressures inside nozzle 22.

Figure 3:
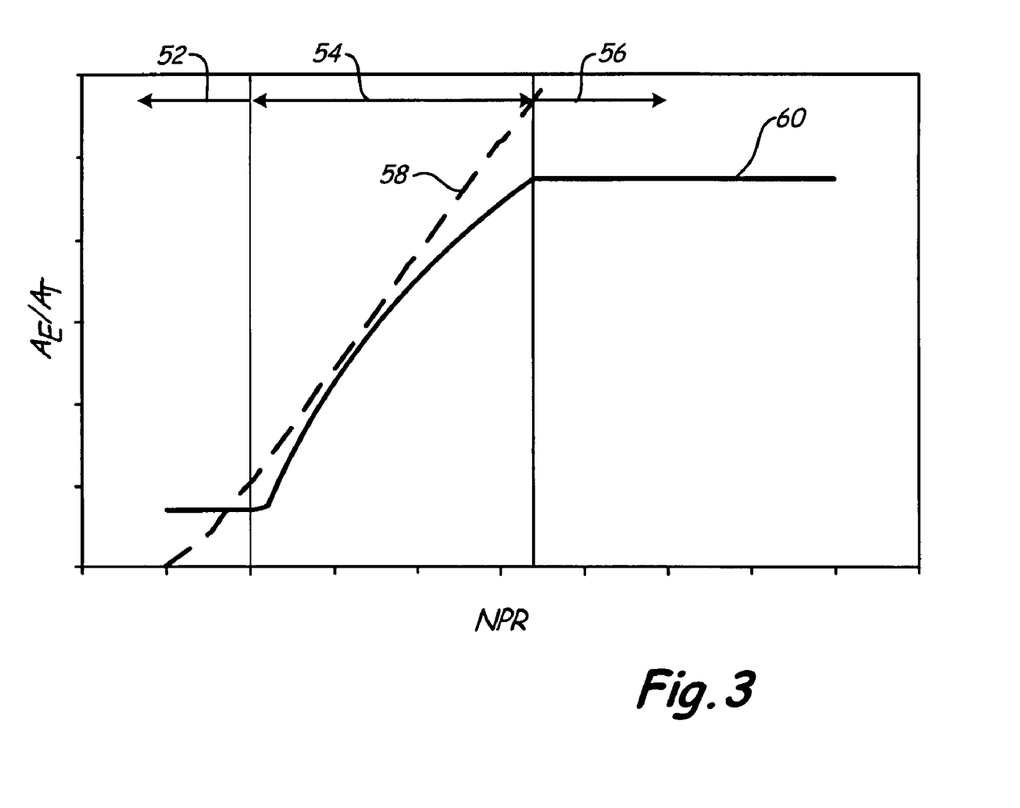
FIGS. 3 and 4 show graphs of nozzle area ratio as a function of NPR, which illustrate performance of nozzles according to the present invention.
Figure 4:
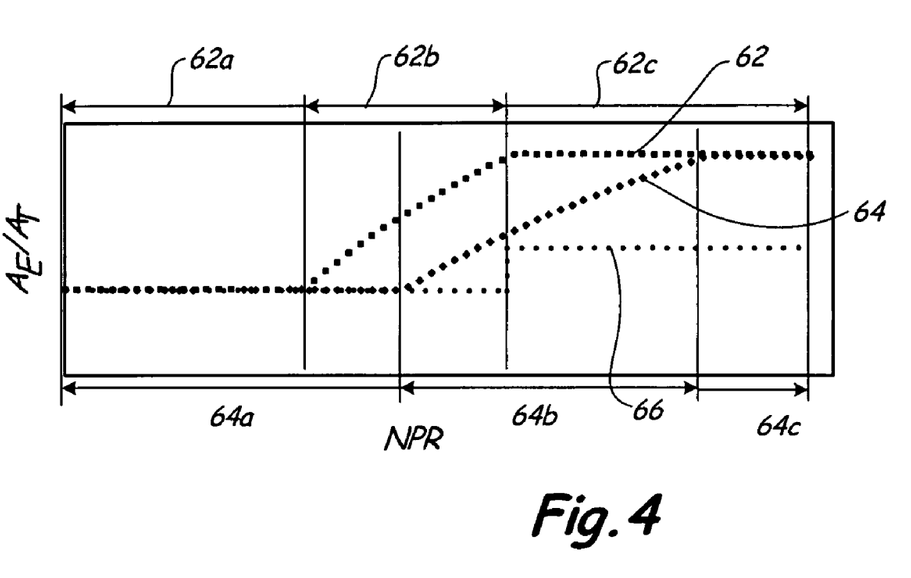

FIGS. 3 and 4 illustrate performance of nozzles according to the present invention by showing graphs of nozzle area ratio ($A_E/A_T$) as a function of NPR ($P_T/P_{Amb}$). FIG. 3 shows a graph of $A_E/A_T$ as a function of NPR for one embodiment of a nozzle according to the present invention including a plurality of mechanisms configured similarly to mechanism 24 shown in FIGS. 1 and 2. FIG. 4 shows a graph of $A_E/A_T$ as a function of NPR for two embodiments of nozzles according to the present invention under different operating conditions and for a common prior convergent-divergent nozzle configuration.

In FIG. 3, $A_E/A_T$ is plotted as a function of NPR for a nozzle including a plurality of mechanisms configured similarly to mechanism 24. FIG. 3 generally shows NPR values ranging from low mode 52, to float mode 54, to high mode 56 and includes first performance curve 58 and second performance curve 60. First performance curve 58 represents ideal $A_E/A_T$, and thereby ideal nozzle geometry variation, for NPR values ranging from low mode 52 to high mode 56. Second performance curve 60 shows $A_E/A_T$ for one embodiment of a nozzle according to the present invention for NPR values ranging from low mode 52 to high mode 56. Nozzles according to the present invention are adapted to float through a range of $A_E/A_T$ values between low mode 52 and high mode 56, as illustrated by the non-linear portion of curve 60 in FIG. 3. Nozzles according to the present invention may be configured for different engine operating conditions to achieve nozzle performance in float mode 54 approximating ideal performance (illustrated in FIG. 3 as second performance curve 60). Performance adjustments in float mode 54 may be achieved by adapting biasing apparatuses included in the nozzle to engine operating conditions. For example, nozzle performance may be adjusted by adapting the biasing force to substantially balance pressure conditions, and thereby define $A_E/A_T$ by positioning the convergent and divergent flaps of the nozzle, through a range of NPR values between low mode 52 and high mode 56.

FIG. 4 shows a graph of $A_E/A_T$ as a function of NPR for two embodiments of nozzles according to the present invention under different operating conditions and for a common prior convergent-divergent nozzle configuration. The graph of FIG. 4 includes third performance curve 62, fourth performance curve 64, and fifth performance curve 66. Third and fourth performance curves 62, 64 represent the performance of two embodiments of nozzles according to the present invention adapted to different engine operating conditions. Third performance curve 62 includes NPR low mode 62a, NPR float mode 62b, and NPR high mode 62c. Fourth performance curve 64 includes NPR low mode 64a, NPR float mode 64b, and NPR high mode 64c.

FIG. 4 illustrates three advantages of convergent-divergent nozzles according to the present invention over prior nozzle configurations. First, nozzles according to the present invention are adapted to include a float mode, for example NPR float mode 62b or NPR float mode 64b. As illustrated in FIG. 4, prior nozzle configurations are substantially incapable of floating, i.e. varying $A_E/A_T$ as a function of NPR, between low mode and high mode. Rather, prior nozzle configurations mechanically or aerodynamically toggle the position of convergent and divergent flaps to achieve $A_E/A_T$ between low and high mode, which is represented in FIG. 4 by fifth performance curve 66 stepping from a low mode $A_E/A_T$ to a high mode $A_E/A_T$ at a given NPR value. Second, the range of $A_E/A_T$ over which nozzles according to the present invention transition from low mode to high mode is substantially greater than in prior nozzles, which is illustrated by the height of the step in fifth performance curve 66 versus the height of NPR float mode 62b in third performance curve 62 and the height of NPR float mode 64b in fourth performance curve 64. Third, nozzles according to the present invention may adapt to different engine NPR modal shifts by adjusting the NPR values at which $A_E/A_T$ shifts from low mode to float mode to high mode. For example, in mechanism 24 of FIGS. 1 and 2, by varying the configuration of fourth link 44 and the pivotal and sliding connection between fourth link 44 and divergent flap 28 the modal shifts of mechanism 24 may be adapted to different engine configurations and operating conditions. In FIG. 4, this performance adjustment is illustrated by the horizontal offset between third performance curve 62 including NPR low, float, and high modes 62a, 62b, 62c and fourth performance curve 64 including NPR low, float, and high modes 64a, 64b, 64c.

Figure 5:
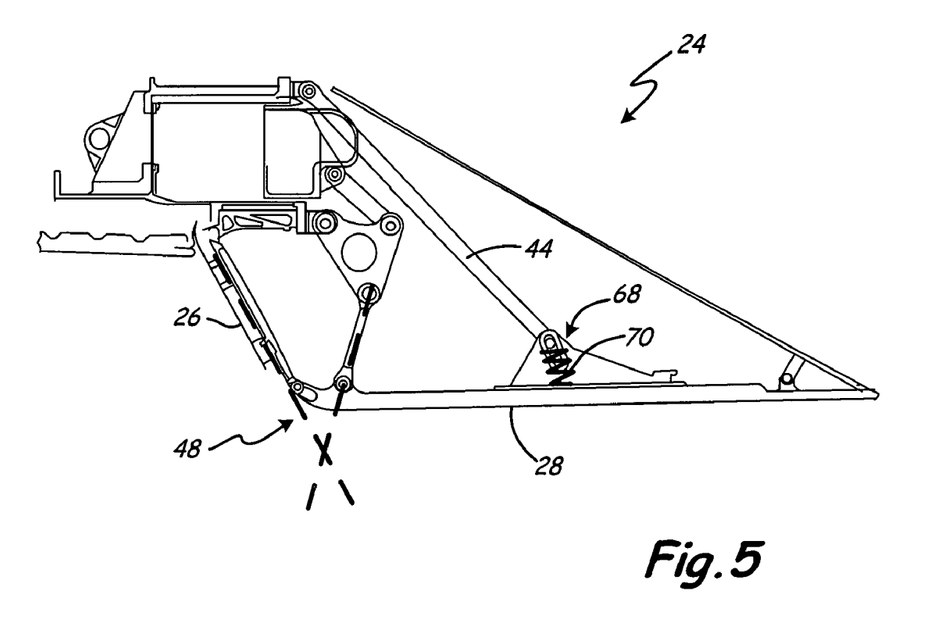
FIGS. 5 and 6 are side views of alternative embodiments of mechanisms included in convergent-divergent nozzles according to the present invention.
Figure 6:
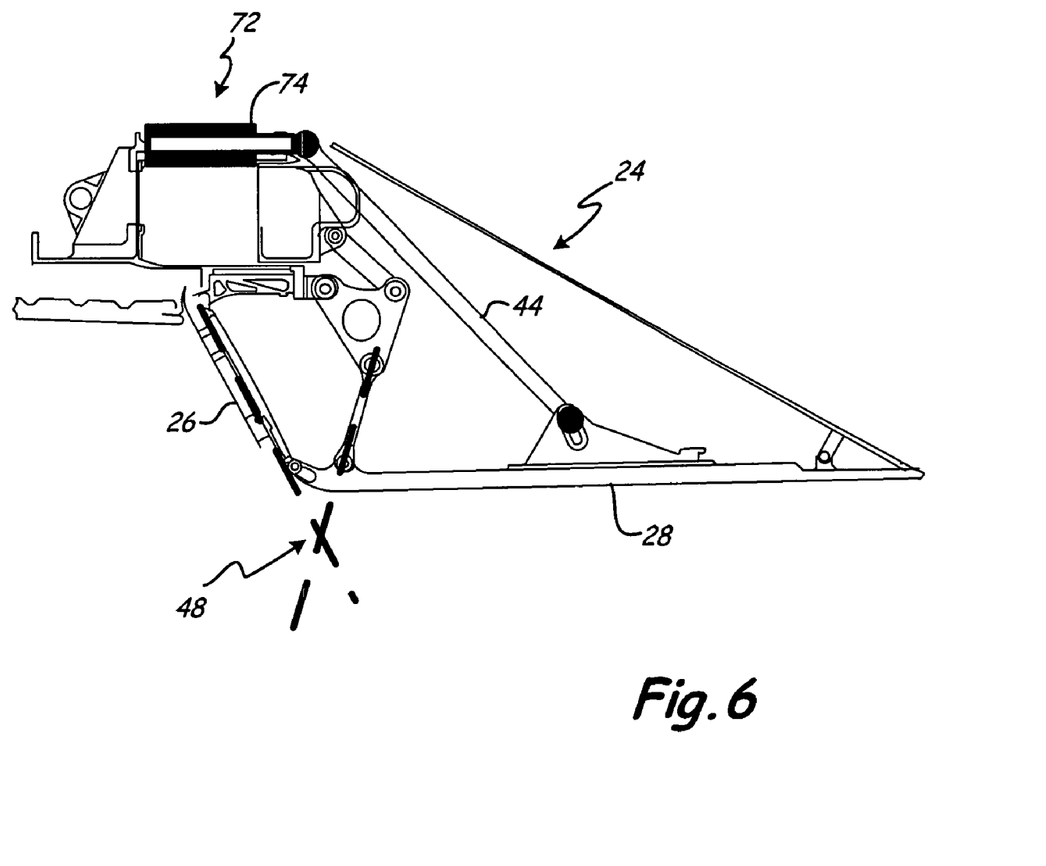

FIGS. 5 and 6 are side views of alternative embodiments of mechanisms included in convergent-divergent nozzles according to the present invention. FIG. 5 is a side view of mechanism 24 including alternative biasing apparatus 68. FIG. 6 is a side view of mechanism 24 including alternative biasing apparatus 72. In FIG. 5, mechanism 24 includes biasing apparatus 68 located at the pivotal and sliding connection between fourth link 44 and divergent flap 28. Biasing apparatus 68 may be employed in lieu of or, as shown in FIG. 5, in addition to biasing apparatus 48. Biasing apparatus 68 may include one or more biasing members, for example, one or more compression springs 70 as shown in FIG. 5. In FIG. 6, mechanism 24 includes biasing apparatus 72 located at the connection between fourth link 44 and the aft end of engine 10. Biasing apparatus 72 may be employed in lieu of or in addition to biasing apparatus 48 or biasing apparatus 68 shown in FIG. 5. Biasing apparatus 72 may include one or more biasing members, for example, solenoid 74 as shown in FIG. 6. Biasing apparatuses 68 and 72, either in combination with each other or with biasing apparatus 48 or by themselves, may be configured to position divergent flap 28 by substantially balancing a force produced by a gas pressure acting on divergent flap 28. Embodiments of the present invention also include other alternative biasing apparatus arrangements not shown in FIGS. 2, 5, and 6. For example, mechanism 24 may include a biasing apparatus including one or more torsional springs located at the pivotal connection between link 44 and the aft end of engine 10. In another embodiment, link 44 may act as a biasing apparatus, for example, by including a fluid pressure biasing member such as a pneumatic or hydraulic cylinder.

Convergent-divergent nozzles and gas turbine engines including convergent-divergent nozzles according to the present invention have several advantages over prior nozzle configurations. Nozzles according to the present invention include a plurality of mechanisms circumferentially arranged about a main axis of the gas turbine engine and configured to mechanically and aerodynamically position convergent and divergent flaps as a function of a gas pressure on the nozzle. Each of the plurality of mechanisms include at least one biasing apparatus configured to position at least one of the convergent and divergent flaps independent of a mechanically prescribed position by substantially balancing a force produced by a gas pressure acting on the nozzle. During engine operation, nozzles according to the present invention are configured to provide a float mode between NPR low and high modes in which the position of one or both the convergent and divergent flaps float through a range of positions as a function of the changing pressure on the nozzle. Also, nozzles according to the present invention are configured to provide a wider range of convergent and divergent flap positions, and thereby nozzle geometry ($A_E/A_T$), between NPR low and high modes than prior nozzles. Finally, nozzles according to the present invention may be adjusted for varying NPR low to high modal shifts, thereby adjusting nozzle performance for different engine configurations and operating conditions. Nozzles according to the present invention therefore substantially increase engine efficiency and performance over prior nozzle configurations by advantageously positioning the convergent and divergent flaps for a substantially greater number of NPR values encountered during engine operation.

Although the present invention has been described with reference to preferred embodiments, workers skilled in the art will recognize that changes may be made in form and detail without departing from the spirit and scope of the invention.

The invention claimed is:

1. A mechanism included in a convergent-divergent nozzle connected to an aft portion of a gas turbine engine, the mechanism comprising:
   a convergent flap configured to be kinematically connected to the aft portion of the gas turbine engine;
   a divergent flap pivotally and directly connected to the convergent flap at a hinged connection;
   at least one actuator configured to be connected to the aft portion of the gas turbine engine and to mechanically prescribe the position of the convergent flap and the divergent flap by moving through one or more positions; and
   at least one biasing apparatus configured to position the divergent flap independent of the one or more positions of the actuator by substantially balancing a force on the divergent flap produced by a gas pressure on the nozzle, the at least one biasing apparatus comprising:
   a biasing linkage directly connected to the divergent flap through a pivotal and sliding connection, the biasing linkage configured to kinematically connect the divergent flap to the aft portion of the gas turbine; and
   a spring is directly connected to the divergent flap at a first end and is connected to the biasing linkage at a second end.

2. The mechanism of claim 1, wherein the hinged connection comprises an offset hinge between the convergent flap and the divergent flap configured to provide a center of rotation of the divergent flap offset from the hinged connection between the divergent flap and the convergent flap.

3. The mechanism of claim 2, wherein the offset hinge is configured to position the divergent flap by substantially balancing a force produced by a gas pressure on the divergent flap with a force produced by a gas pressure on the convergent flap.

4. The mechanism of claim 2, wherein the offset hinge comprises one or more links configured to be kinematically connected between the aft portion of the gas turbine engine and the divergent flap toward the hinged connection between the divergent flap and the convergent flap.

5. The mechanism of claim 4, wherein the one or more links comprise:
   a first link pivotally connected to the at least one actuator;
   a second link pivotally connected to the first link and configured to be pivotally connected to the aft portion of the gas turbine engine; and
   a third link pivotally connected to the second link and the divergent flap toward the hinged connection between the divergent flap and the convergent flap.

6. The mechanism of claim 1, wherein the biasing linkage is configured to be pivotally connected to the aft portion of the gas turbine engine at a pivotal connection and pivotally and slidably connected to the divergent flap toward a middle portion of the divergent flap.

7. The mechanism of claim 6, wherein the at least one biasing apparatus comprises one or more biasing members in addition to the spring, wherein the one or more biasing members and the spring are configured to bias the pivotal and sliding connection between the divergent flap and the biasing linkage and the pivotal connection between the biasing linkage and the aft portion of the gas turbine engine.

8. The mechanism of claim 7, wherein the one or more biasing members are selected from a group of biasing members comprising springs, fluid pressurized members, and mechanical and electro-mechanical actuators.

9. A convergent-divergent nozzle of a gas turbine engine comprising:
   an annular ring configured to be connected to an aft portion of the gas turbine engine;
   a plurality of mechanisms circumferentially connected to the annular ring about a main axis of the gas turbine engine;
   wherein the plurality of mechanisms each comprise:
   a convergent flap configured to be kinematically connected to the aft portion of the gas turbine engine;
   a divergent flap pivotally and directly connected to the convergent flap at a hinged connection;

at least one actuator connected to the annular ring and configured to mechanically prescribe the position of the convergent flap and the divergent flap by moving through one or more positions; and at least one biasing apparatus configured to position the divergent flap independent of the one or more positions of the actuator by substantially balancing a force on the divergent flap produced by a gas pressure on the nozzle, the at least one biasing apparatus comprising:

a biasing linkage directly connected to the divergent flap through a pivotal and sliding connection, the biasing linkage configured to kinematically connect the divergent flap to the aft portion of the gas turbine; and a spring is directly connected to the divergent flap at a first end and is connected to the biasing linkage at a second end.

10. The nozzle of claim 9, wherein the hinged connection comprises an offset hinge between the convergent flap and the divergent flap configured to provide a center of rotation of the divergent flap offset from the hinged connection between the divergent flap and the convergent flap.

11. The nozzle of claim 10, wherein the offset hinge is configured to position the divergent flap by substantially balancing a force produced by a gas pressure on the divergent flap with a force produced by a gas pressure on the convergent flap.

12. The nozzle of claim 10, wherein the offset hinge comprises one or more links configured to be kinematically connected between the aft portion of the gas turbine engine and the divergent flap toward the hinged connection between the divergent flap and the convergent flap.

13. The mechanism of claim 12, wherein the one or more links comprise:

a first link pivotally connected to the at least one actuator;

a second link pivotally connected to the first link and configured to be pivotally connected to the aft portion of the gas turbine engine; and a third link pivotally connected to the second link and the divergent flap toward the hinged connection between the divergent flap and the convergent flap.

14. The nozzle of claim 9, wherein the biasing linkage is configured to be pivotally connected to the aft portion of the gas turbine engine at a pivotal connection and pivotally and slidably connected to the divergent flap toward a middle portion of the divergent flap.

15. The nozzle of claim 14, wherein the at least one biasing apparatus comprises one or more biasing members in addition to the spring, wherein the one or more biasing members and the spring are configured to bias the pivotal and sliding connection between the divergent flap and the biasing linkage and the pivotal connection between the biasing linkage and the aft portion of the gas turbine engine.

16. The nozzle of claim 15, wherein the one or more biasing members are selected from a group of biasing members comprising springs, fluid pressurized members, and mechanical and electro-mechanical actuators.

* * * * *